United States Patent Office.

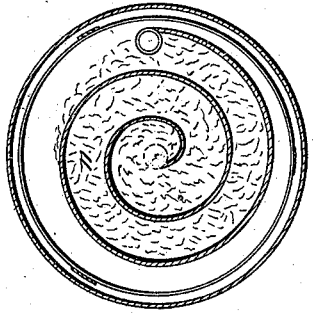
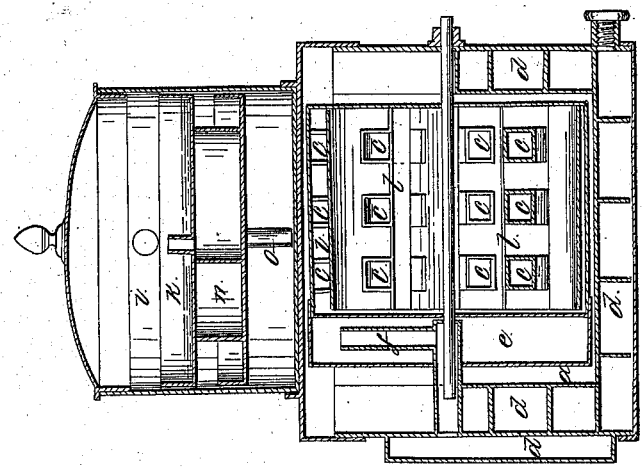
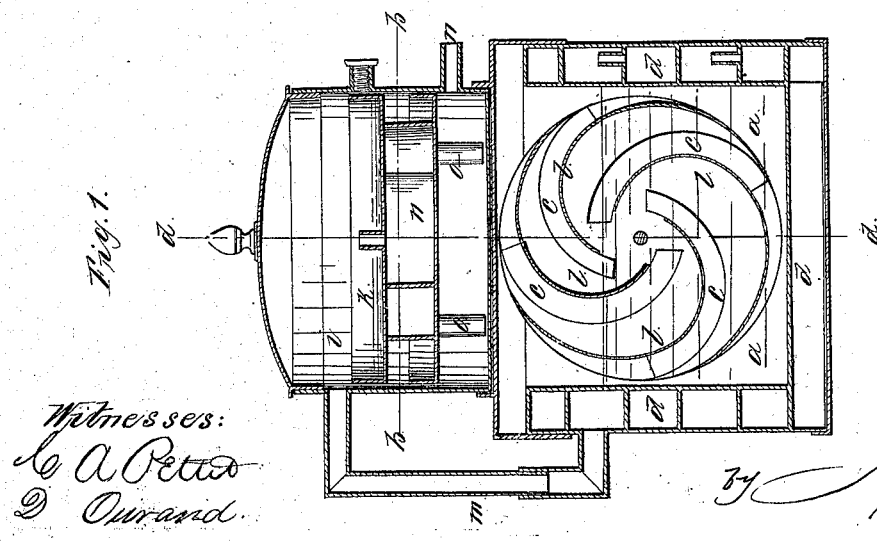

JAMES F. SPENCE, OF BROOKLYN, NEW YORK.

Letters Patent No. 105,994, dated August 2, 1870.

IMPROVEMENT IN APPARATUS FOR CARBURETING AIR.

The Schedule referred to in these Letters Patent and making part of the same.

*To all whom it may concern:*

Be it known that I, JAMES F. SPENCE, of Brooklyn, in the county of Kings and State of New York, have invented a new and Improved Machine for Carbureting Air; and I do hereby declare that the following is a full, clear, and exact description of the same, reference being had to the accompanying drawing forming a part of this specification, in which—

Figure 1 is a sectional elevation;

Figure 2 is a sectional elevation in the line *d d*, fig. 1; and

Figure 3 is a plan view of the chamber that contains iron filings, taken in the line *b b*, fig. 1.

This invention consists in a fan-wheel whose wings are each provided with a series of parallel pipes, through which, when the wheel is more than half submerged in a reservoir of water, and rotated therein, air is forced into the axial chamber in the interior of the wheel by the rising of the water in the pipes as the latter descend.

The invention also consists in a reservoir for holding the water in which the said fan-wheel revolves, made with hollow walls, which serve as carbureting-chambers, for the purpose of causing an even temperature to be maintained in such carbureting-chambers by the water in the reservoir; and The invention also consists in a process of purifying the gas after it emerges from the carbureter, by passing it over a vessel containing sulphuric acid, and of drying the gas subsequent to such purification, by passing it through a volute-chamber containing iron turnings immersed in water, by which processes the illuminating capacity of the gas is also increased.

In the drawing—

*a* is the water-reservoir.

*l*, the wings of the fan-wheel, which turns in the reservoir.

*c*, the pipes attached to each wing.

*d*, the hollow walls of the reservoir, forming the carbureter.

*e*, an air-chamber attached to one end of the fan-wheel.

*f*, a pipe leading from said air-chamber to the carbureter *d*.

*m*, a pipe leading from the carburreter to an upper reservoir, *i*.

*k*, the vessel, within such upper reservoir, which contains sulphuric acid.

*n*, the volute-chamber, beneath the vessel *k*, which contains iron turnings.

*o*, pipes leading downward out of the volute-chamber.

*r*, the pipe by which gas flows from the reservoir *i* to the burner.

As the fan-wheel revolves, the water entering the mouths of the descending pipes *c*, forces air through the same into the axial chamber of the wheel; thence the air passes into the chamber *e*, whence it flows, by the pipe *f*, to the carbureter, passing through which it rises, through the pipe *m*, to the reservoir *i*, in which it passes over the open vessel *k*, containing sulphuric acid, where it is purified. Thence the gas passes downward into the volute-chamber *n*, where it is dried by the iron turnings. Finally, it flows away in a condition fit for use.

The pipes *c* are of such length and curvature that, before the air ceases flowing out of one set, the mouths of the next set following enter the water, and a blast issues from them also; hence there is always a steady current of air flowing into the axial-chamber of the fan-wheel.

I am aware that sulphuric acid and iron turnings have been used together for the purpose of generating gas. I use them separately, however—the acid for purifying gas that has already been made, and the iron for drying the same.

Having thus described my invention,

What I claim as new, and desire to secure by Letters Patent, is—

1. The reservoir *a*, provided with hollow walls *d*, arranged to serve as carbureting-chambers, substantially as described.

2. The process of purifying and drying carbureted air by passing it first over a vessel containing sulphuric acid, and then through a chamber containing iron turnings, substantially as described.

To the above specification of my invention I have set my hand this 11th day of May, 1870.

JAMES F. SPENCE.

Witnesses:
SOLON C. KEMON,
CHAS. A. PETTIT.